Oct. 13, 1970   E. M. KLOPP ET AL   3,533,844
THERMAL BATTERY CELL
Filed Sept. 14, 1966

INVENTORS.
TERRENCE J. KURTZWEIL
BY and EDWARD M. KLOPP
H. H. Losche
Paul S. Collignon
ATT'YS.

3,533,844
THERMAL BATTERY CELL
Edward M. Klopp, Seville, and Terrence J. Kurtzweil, Avon, Ohio, assignors, by mesne assignments, to the United States of America as represented by the Secretary of the Navy
Filed Sept. 14, 1966, Ser. No. 580,147
Int. Cl. H01m 29/00
U.S. Cl. 136—83          1 Claim

ABSTRACT OF THE DISCLOSURE

A thermally activated cell operating at elevated temperatures whereby the anode and electrolyte are in a molten condition, said cell having a perforated barrier adjacent the anode for retaining by capillary action any liquid materials formed in the anode during operation of the cell and preventing the migration of the liquid materials to the cathode.

---

The present invention relates to the construction of cells for batteries and more particularly to improved construction of thermally activated cells.

In the heretofore known construction of thermally activated cells, an active metal anode of a material such as calcium or magnesium is provided along with a depolarizer of a material such as cupric oxide or antimony trioxide, and an electrolyte. The cells are operated at a temperature in excess of one thousand degrees F. and some of the active materials and the electrolyte are in a molten condition and there is an intermixing which causes shorting and deterioration of cell performance. For example, it has been found that calcium from the anode will displace molten lithium from a potassium chloride-lithium chloride electrolyte to form a low melting alloy which will cross the electrolyte and form a direct electrical short between the anode and cathode.

The present invention relates to an improved construction for thermally activated cells by providing a perforated barrier adjacent the anode. The barrier retains by capillary action any liquid materials formed in the anode area during operation of the cell and prevents the migration of the liquid materials to the cathode.

It is therefore a general object of the present invention to provide an improved battery cell that will efficiently operate at elevated temperatures.

Another object of the present invention is to provide means in a battery cell for preventing shorting between the anode and cathode.

Still another object of the present invention is to provide a barrier in a cell between the anode and cathode for preventing migration of molten materials.

Figure 1:
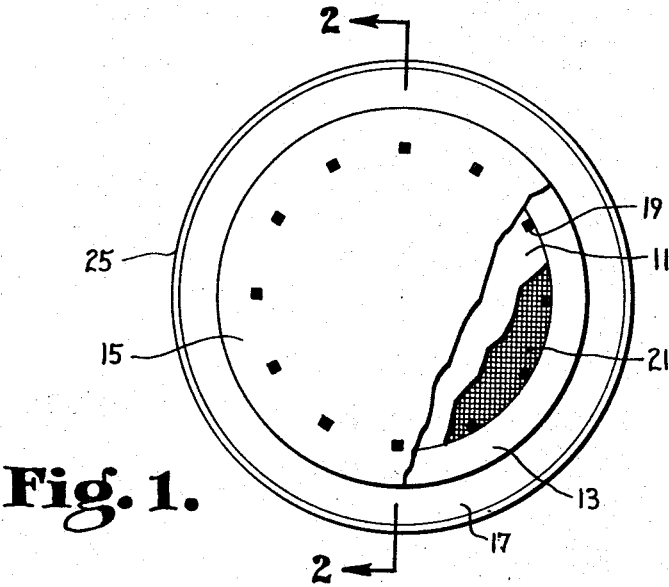
Figure 2:
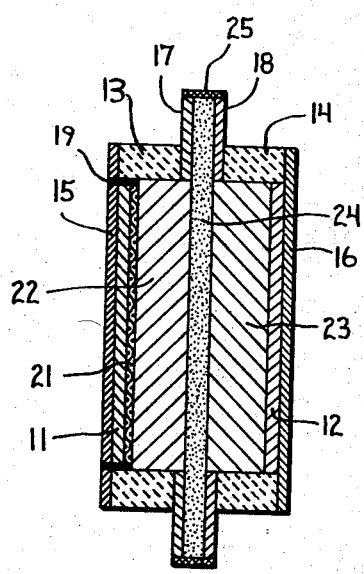

Other objects and advantages of the present invention will be readily appreciated as the same becomes better understood by reference to the following detailed description when considered in connection with the accompanying drawing wherein:

FIG. 1 is a plan view of a cell, partly broken away to show various elements; and FIG. 2 is a sectional view taken on line 2—2 of FIG. 1.

Referring now to the drawing, there is shown a cell having an anode 11 and a cathode 12. By way of example, anode 11 might be either calcium or magnesium and the cathode 12 might be either cupric oxide or antimony trioxide. A pair of annular ceramic rings 13 and 14 have metallic plates 15 and 16, respectively, attached to one end thereof as by brazing. By way of example, the annular ceramic rings might be beryllia and plates 15 and 16 might be nickel, and these plates serve as current collectors. An outwardly extending ring 17 is attached to the other end of ceramic ring 13 and, likewise, an outwardly extending ring 18 is attached to the other end of ceramic ring 14. As will be hereinafter explained, rings 17 and 18, which might be made of nickel, are used to seal the cell.

Ceramic ring 13 and plate 15 form a cup-shaped member, and anode 11 is positioned therein. Anode 11 is provided with a plurality of notches 19 on its outer periphery. A screen 21 is positioned adjacent anode 11 and screen 21 is spot-welded to plate 15 through notches 19 thereby securing both anode 11 and screen 21 to plate 15. A layer of electrolyte 22 is placed adjacent to screen 21. Likewise, ceramic ring 14 and plate 16 form a cup-shaped member and cathode 12 and electrolyte 23 are positioned therein. A separator disk 24 of porous material is provided between electrolytes 22 and 23, and disk 24 extends between rings 17 and 18. A welded bead 25 secures rings 17 and 18 together and seals the cell assembly.

By way of a specific example, a cell of the type herein described was made using a potassium chloride-lithium chloride eutectic electrolyte, a calcium anode, and a cathode depolarizer. The cathode depolarizer was comprised of about 75.8 percent of a mixture of potassium phosphate-lithium phosphate, about 22.6 percent carbon, and about 1.6 percent sodium fluoride. The small amount of sodium fluoride was used to cause depolymerization of the phosphates. A mixture of the heretofore mentioned percentages of ingredients was pressed into a flat pellet to form the cathode. An electrolyte mix comprised of about a 73 percent mixture of lithium chloride and potassium chloride and about 27 percent of Micria was spread on top of the cathode pellet and the two were then pressed together and heated to form a unitary pellet. Micria is finely divided fibrous alumina produced by the Monsanto Chemical Company. The unitary pellet consisting of the cathode 12 and electrolyte 23 was then placed in the cup-shaped member formed by the ceramic ring 14 and plate 16.

The anode of the cell was comprised of a thin layer of calcium which was notched at intervals along its periphery. The anode was placed in the cup-shaped member formed by the ceramic ring 13 and plate 15 and a thin nickel screen 21 was placed over the anode and spot welded through the notches in the calcium to plate 15. The thin nickel screen was about .007 inch thick and of 150 mesh with an opening size of about $17 \times 10^{-6}$ square inch. An electrolyte layer comprised of about a 73 percent mixture of lithium chloride and potassium chloride and about 27 percent of Micria was placed adjacent the nickel screen. A porous sintered metal disk 24 was placed between the two cup-shaped members and the two sections were welded together thereby providing a completely sealed unit. The cell, as constructed, was effective in preventing malfunction due to migration of the anode which became liquid when heated to elevated temperatures.

Obviously many modifications and variations of the present invention are possible in the light of the above teachings. For example, while the specific example described above disclosed a calcium anode, the utilization of a screen barrier would also have utility with other anodes, such as magnesium, lithium, sodium, and potassium, which will become liquid at cell operating temperatures. Also when materials are used that have a greater viscosity at cell operating temperatures, screen having larger openings may be utilized. It is therefore to be understood, that within the scope of the appended claim, the invention may be practiced otherwise than as specifically described.

What is claimed is:

1. A thermally activated cell operable at elevated temperatures such that an anode and an electrolyte are in a molten condition, said cell comprising:

a first annular ring of ceramic material having a metallic plate brazed to one end thereby providing a first cup-shaped member, a cathode and a first quantity of an electrolyte in said first cup-shaped member, said cathode being adjacent said metallic plate, a second annular ring having a second metallic plate brazed to one end thereby providing a second cup-shaped member, an anode and a second quantity of electrolyte in said second cup-shaped member, said anode being adjacent said second metallic plate and separated from said second quantity of electrolyte by a perforated barrier, means for attaching said first and second cup-shaped members in sealing relation with said first and second metallic plates being at opposed ends, and a porous separator disk spaced between said first and second quantities of electrolyte.

References Cited

UNITED STATES PATENTS

| | | |
|---|---|---|
| 2,612,534 | 9/1952 | Blake. |
| 2,699,459 | 1/1955 | Blake et al. |
| 2,997,518 | 8/1961 | Klopp et al. |
| 3,023,262 | 2/1962 | Emmerling et al. |
| 3,160,531 | 12/1964 | Spindler _____ 136—83 |
| 3,245,836 | 4/1966 | Agruss _____ 136—83 |
| 3,306,776 | 2/1967 | Tamminen _____ 136—83 |

REUBEN EPSTEIN, Primary Examiner

U.S. Cl. X.R.

136—100